United States Patent
Suzuki et al.

(10) Patent No.: US 11,230,015 B2
(45) Date of Patent: Jan. 25, 2022

(54) ROBOT SYSTEM

(71) Applicant: FUJI CORPORATION, Chiryu (JP)

(72) Inventors: Masato Suzuki, Chiryu (JP); Takashi Taneike, Okazaki (JP); Satoru Nishiyama, Nagoya (JP)

(73) Assignee: FUJI CORPORATION, Chiryu (JP)

( * ) Notice: Subject to any disclaimer, the term of this patent is extended or adjusted under 35 U.S.C. 154(b) by 130 days.

(21) Appl. No.: 16/488,606

(22) PCT Filed: Mar. 23, 2017

(86) PCT No.: PCT/JP2017/011594
§ 371 (c)(1),
(2) Date: Aug. 26, 2019

(87) PCT Pub. No.: WO2018/173178
PCT Pub. Date: Sep. 27, 2018

(65) Prior Publication Data
US 2020/0023522 A1 Jan. 23, 2020

(51) Int. Cl.
*B25J 9/16* (2006.01)
*B25J 19/02* (2006.01)
*B25J 13/08* (2006.01)

(52) U.S. Cl.
CPC ............ *B25J 9/1697* (2013.01); *B25J 13/08* (2013.01); *B25J 19/023* (2013.01)

(58) Field of Classification Search
USPC ................................................ 700/245–264
See application file for complete search history.

(56) References Cited

U.S. PATENT DOCUMENTS 4,613,269 A * 9/1986 Wilder .................. B25J 9/1697
348/92
4,942,538 A * 7/1990 Yuan ..................... B25J 9/1689
700/259

(Continued)

FOREIGN PATENT DOCUMENTS

EP 2543482 A1 * 1/2013 ............... G06T 7/75
EP 2543483 A1 * 1/2013 ............ B25J 9/1697

(Continued)

OTHER PUBLICATIONS

Adapt Technology: "Adept Vision User's Guide Version" Retrieved from the Internet: URL: https://www.engr.colostate.edu/me/facil/ramlab/adep/v_vmeug.pdf [retrieved on Feb. 12, 2020], Aug. 1996, 27 pages.

(Continued)

Primary Examiner — Jonathan L Sample
(74) Attorney, Agent, or Firm — Oblon, McClelland, Maier & Neustadt, L.L.P.

(57) ABSTRACT

The robot system for which the position of a camera attached to the arm is changeable to multiple positions. The robot system memorizes offset information between the arm and the camera for each of multiple positions. Further, the robot system moves the arm to the position offset by the offset information corresponding to the attachment position of the selected camera. As a result, even when the mounting position of the camera is changed, the robot system can move the camera to an appropriate position when imaging and perform imaging without requiring troublesome teaching.

4 Claims, 5 Drawing Sheets

(56) References Cited

U.S. PATENT DOCUMENTS

| | | | |
|---|---|---|---|
| 5,014,183 A | 5/1991 | Carpenter et al. | |
| 5,083,073 A * | 1/1992 | Kato | B25J 9/1697 318/568.13 |
| 5,305,427 A * | 4/1994 | Nagata | B25J 19/023 700/259 |
| 5,319,443 A * | 6/1994 | Watanabe | B25J 9/1692 356/614 |
| 5,974,643 A * | 11/1999 | Hays | B23Q 17/2233 29/39 |
| 2003/0034971 A1* | 2/2003 | Fujiwara | G06T 17/30 345/420 |
| 2004/0172164 A1* | 9/2004 | Habibi | G06T 1/0007 700/245 |
| 2010/0222925 A1* | 9/2010 | Anezaki | G05D 1/0253 700/253 |
| 2010/0312393 A1* | 12/2010 | Someya | B25J 9/1697 700/259 |
| 2011/0164114 A1* | 7/2011 | Kobayashi | G01B 11/25 348/46 |
| 2012/0188350 A1* | 7/2012 | Hammond | H04N 5/23203 348/61 |
| 2013/0065797 A1* | 3/2013 | Silbert | G01N 1/31 506/39 |
| 2013/0120547 A1* | 5/2013 | Linnell | B25J 9/1682 348/61 |
| 2014/0229005 A1* | 8/2014 | Suzuki | B25J 9/1697 700/254 |
| 2014/0288710 A1* | 9/2014 | Ikenaga | B25J 9/1692 700/259 |
| 2015/0148664 A1* | 5/2015 | Stolka | A61B 90/30 600/424 |
| 2016/0059419 A1* | 3/2016 | Suzuki | B25J 9/1697 700/114 |
| 2016/0086343 A1* | 3/2016 | Namiki | G06T 7/001 348/135 |
| 2016/0140734 A1* | 5/2016 | Kato | G06K 9/6201 348/222.1 |
| 2016/0279800 A1* | 9/2016 | Onda | B25J 9/1697 |
| 2016/0288333 A1* | 10/2016 | Yamaguchi | B25J 9/1692 |
| 2017/0151671 A1* | 6/2017 | Ishige | B25J 9/1697 |
| 2017/0165841 A1* | 6/2017 | Kamoi | H04N 7/183 |
| 2018/0101943 A1* | 4/2018 | Konopacki | G06T 7/60 |
| 2020/0021743 A1* | 1/2020 | Yoshida | B25J 9/1692 |

FOREIGN PATENT DOCUMENTS

| | | |
|---|---|---|
| JP | 64-2891 | 1/1989 |
| JP | 1-207610 | 8/1989 |
| JP | 2012-240174 A | 12/2012 |

OTHER PUBLICATIONS

EPSON Anonymous: "EPSON RC+7.0 Option Vision Guide 7.0 Ver. 7.1 Software Rev. 3 EM158S3007F" Retrieved from the Internet: URL:http://www.epson.com.cn/robots/admin/modules/page_editor/uploads/pdf/20151124/english/e_VisionGuide71_software_r3.pdf [retrieved on Jun. 12, 2018], Nov. 24, 2015, 20 pages.

International Search Report dated May 16, 2017 in PCT/JP2017/011594 filed on Mar. 23, 2017.

* cited by examiner

FIG. 4C
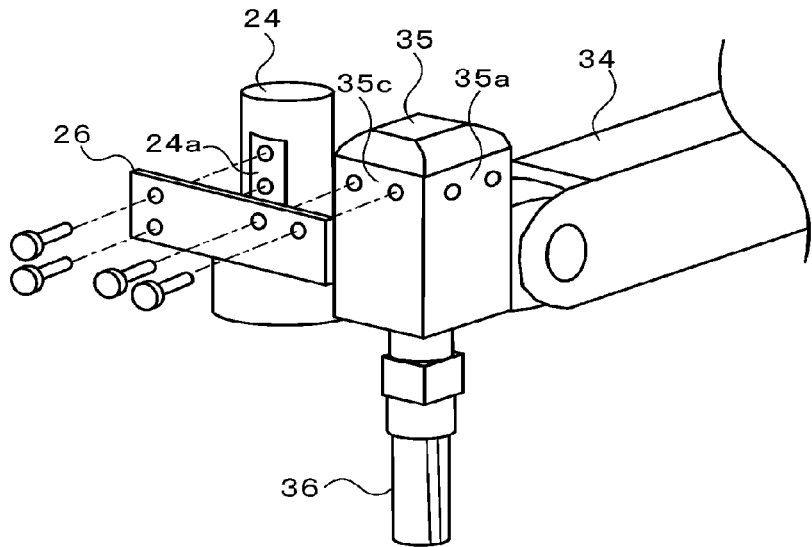
FIG. 4D
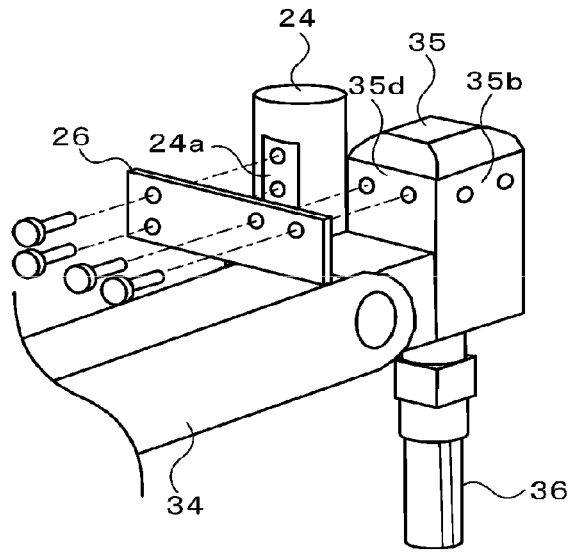
FIG. 5
| Camera attachment position CP | Offset information $(\Delta X, \Delta Y, \Delta Z)$ |
|---|---|
| Front surface side | $(\Delta X1, \Delta Y1, \Delta Z1)$ |
| Rear surface side | $(\Delta X2, \Delta Y2, \Delta Z2)$ |
| Right surface side | $(\Delta X3, \Delta Y3, \Delta Z3)$ |
| Left surface side | $(\Delta X4, \Delta Y4, \Delta Z4)$ |

ROBOT SYSTEM

TECHNICAL FIELD

This specification discloses a robot system comprising a multi joint robot and a camera.

BACKGROUND ART

Conventionally, there is a known robot system including a multi joint robot and a camera provided at a distal end portion of the robot, the system measuring a reference position of a vehicle body part (workpiece) using the multi joint robot and the camera (for example, refer to patent literature 1). The measurement of the reference position is performed by marking the periphery of the reference position of the vehicle body part (work) to be measured, aligning the camera at the end of the multi joint robot with respect to the reference position, and reading the marking provided at the periphery of the reference position with respect to the camera coordinates. The alignment of the camera with respect to the reference position is performed by robot teaching.

CITATION LIST

Patent Literature

Patent literature 1: JP-A-H1-207610

SUMMARY

However, for example, in a robot system constructed in such a manner in which multiple of the multi joint robots cooperate to perform a predetermined operation, the attachment position of the camera may have to be changed so that the camera mounted on a multi joint robot does not interfere with other multi joint robots. In such a robot system, when the attachment position of the camera is changed, the positional relationship between the multi joint robot and the camera changes, and the imaging range of the camera changes. Therefore, it is necessary for the operator to perform teaching each time, and there is a problem that a great amount of labor is required.

It is a main object of the present disclosure to provide a robot system capable of moving a camera to an appropriate position when imaging without an operator having to perform a troublesome operation even if the position of a camera attached to a multi-joint robot is changed.

The present disclosure employs the following means to achieve the above object.

Disclosed herein is a robot system for which the position of a camera attached to an arm of a multi joint robot is changeable to multiple predetermined positions, the robot system including: a memory device configured to memorize in advance offset information between the arm and the camera for each of the multiple positions; and a control device configured to control the multi joint robot such that, when a target object is imaged by the camera, offset information corresponding to the attachment position of the camera is read out from the memory device, and the arm is moved based on the read-out offset information such that the target object is imaged by the camera.

In a robot system of the present disclosure, offset information between the multi joint robot and the camera is memorized in a memory device for each of multiple positions at which the camera can be attached. Further, the robot system moves the arm to the position offset by the offset information corresponding to the attachment position of the selected camera. As a result, even when the mounting position of the camera is changed, the robot system can move the camera to an appropriate position when imaging and perform imaging without requiring troublesome teaching.

BRIEF DESCRIPTION OF DRAWINGS

FIG. 4C illustrates a state in which camera 24 is attached to a right surface side of a distal end portion of arm 22.

FIG. 4D illustrates a state in which camera 24 is attached to a left surface side of a distal end portion of arm 22.

FIG. 5 illustrates offset information of camera 24.

DESCRIPTION OF EMBODIMENTS

Embodiments of the present disclosure are described below with reference to the figures.

Figure 1:
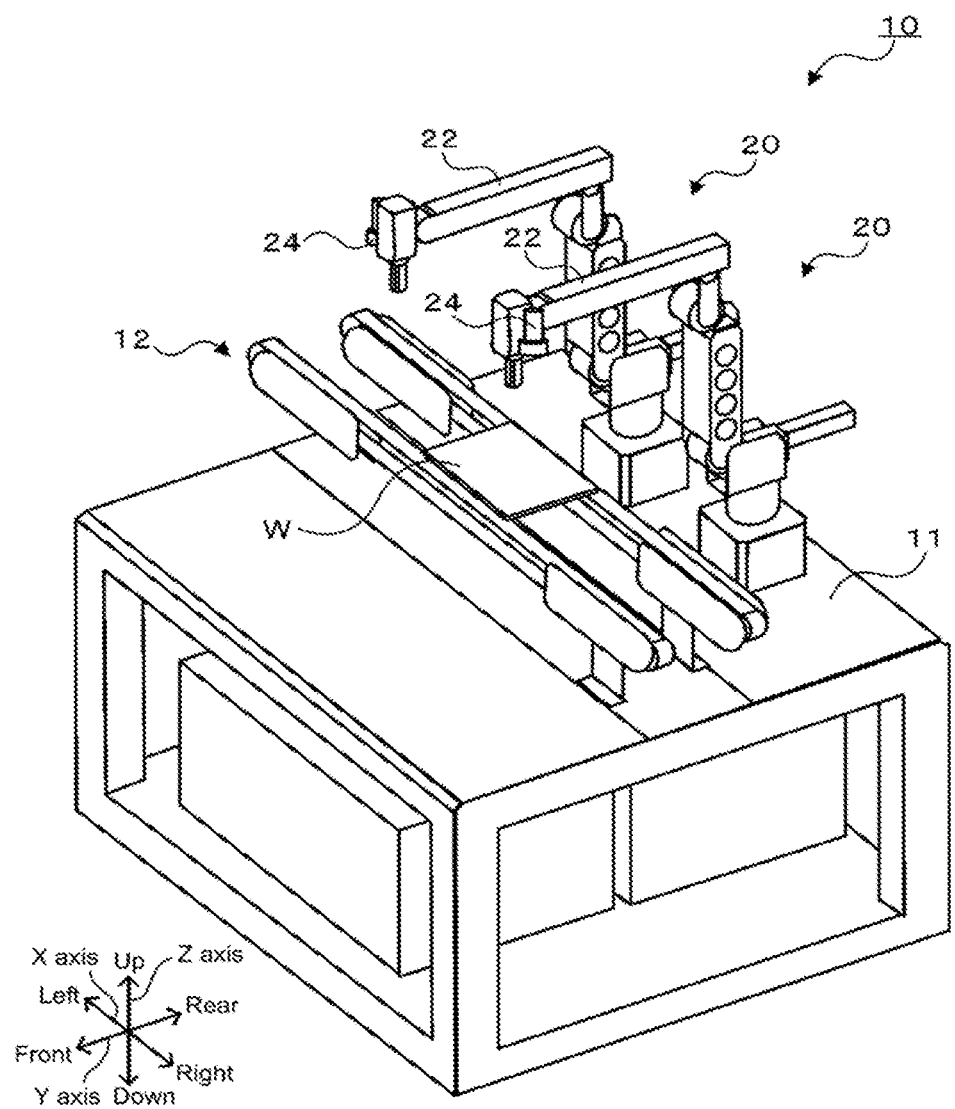
FIG. 1 shows the overall configuration of robot system 10.
Figure 2:
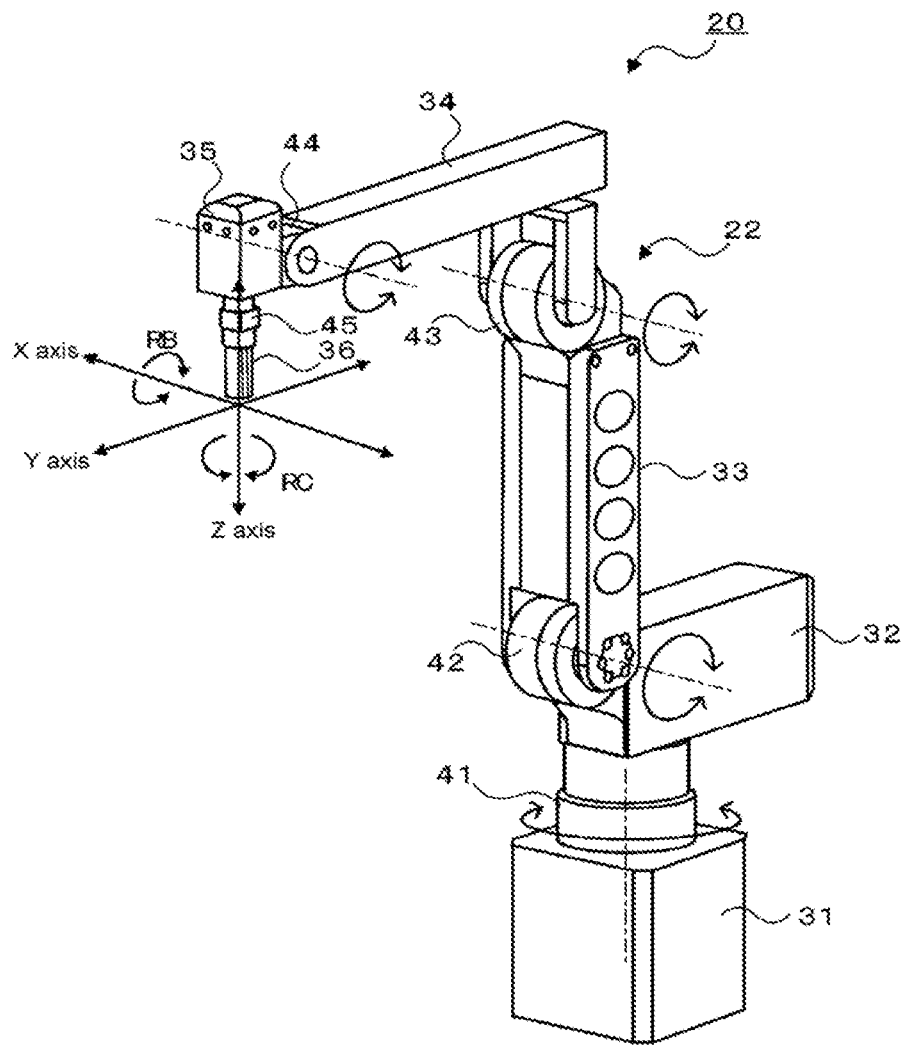
FIG. 2 shows the overall configuration of robot 20.
Figure 3:
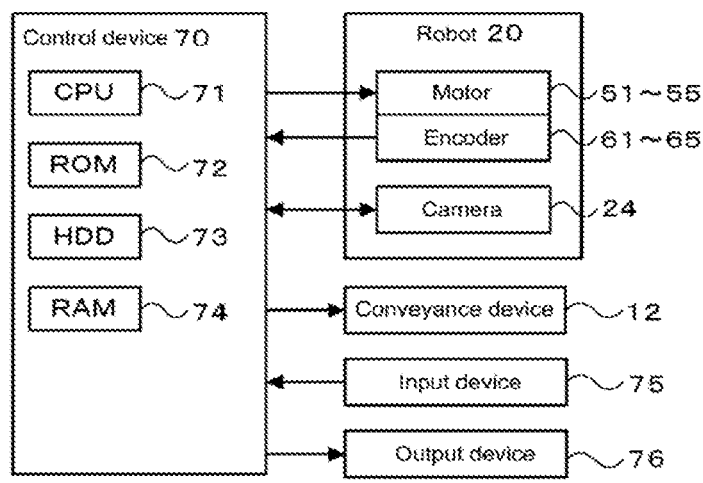
FIG. 3 is a block diagram showing electrical connections between robot 20 and controller 70.

FIG. 1 shows the overall configuration of robot system 10. FIG. 2 shows the overall configuration of robot 20. FIG. 3 is a block diagram showing electrical connections between robot 20 and controller 70. Note that, in FIG. 1, the left-right direction is the X-axis direction, the front-rear direction is the Y-axis direction, and the up-down direction is the Z-axis direction.

Robot system 10 is a work system that performs specified work on workpiece W. The specified work may include pickup work for picking up a workpiece, placing work for placing a workpiece at a specified position, and assembling work for assembling the workpiece at a specified position. As shown in FIG. 1, robot system 10 includes conveyance device 12 that is installed at the approximate center of work table 11 and conveys the workpiece W in the X-axis direction (left-right direction), multiple (two) robots 20 that are arranged side by side in the conveyance direction of workpiece W and perform work in cooperation on the workpiece W, and control device 70 (see FIG. 3) that controls the robots 20.

Conveyance device 12 is a belt conveyor device, and conveys the workpiece W placed on the belt from left to right (X-axis direction) in FIG. 1.

As shown in FIG. 2, each of the robots 20 includes a vertical articulated arm (also referred to as arm) 22 having five axes. Each arm 22 has six links (first to sixth links 31 to 36) and five joints (first to fifth joints 41 to 45) for rotatably or pivotally connecting each link. Each of the joints (first to fifth joints 41 to 45) is provided with a motor (servo motor) 51 to 55 for driving the corresponding joint, and an encoder (rotary encoder) 61 to 65 for detecting the rotational position of the corresponding motor.

A work tool serving as an end effector is detachably attachable to sixth link 36 of arm 22. Examples of the work tool include an electromagnetic chuck, a mechanical chuck, and a suction nozzle. The tool to be mounted on the tip link is appropriately selected in accordance with the shape and material of the workpiece W to be worked.

Arm 22 of the present embodiment can move in a three-dimensional space in which a front (front) and rear (back) direction of the robot 20 as viewed from the front is the Y axis, a vertical direction of the robot 20 (a direction in which the rotational axis of first joint 41 extends) is the Z axis, and a direction perpendicular to the Y axis and the Z axis is the X axis. Further, arm 22 is able to move in a rotational direction (RC) around the Z axis, and a rotational direction (RB) around the X axis.

Figure 4A:
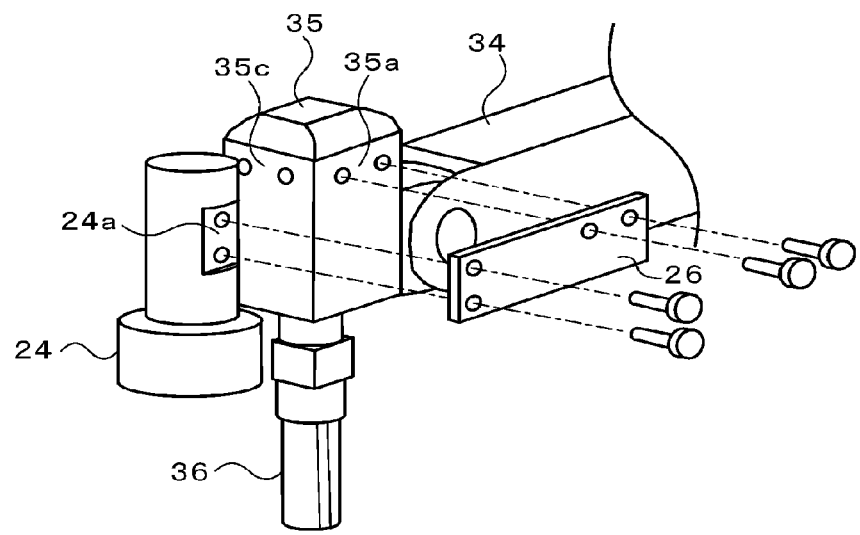
FIG. 4A illustrates a state in which camera 24 is attached to a front surface side of a distal end portion of arm 22.
Figure 4B:
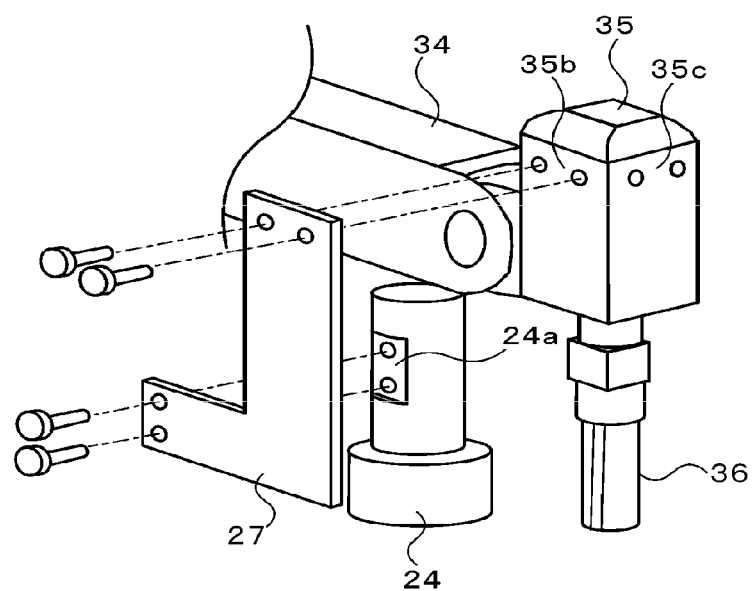
FIG. 4B illustrates a state in which camera 24 is attached to a rear surface side of a distal end portion of arm 22.

Also, as shown in FIG. 1, camera 24 is attached to the distal end section (fifth link 35) of arm 22. Camera 24 is used for capturing an image of the workpiece W in order to recognize the position, posture, and the like of the workpiece W conveyed by conveyance device 12. FIG. 4A illustrates a state in which camera 24 is attached to a front surface side of a distal end portion of arm 22. FIG. 4B illustrates a state in which camera 24 is attached to a rear surface side of a distal end portion of arm 22. FIG. 4C illustrates a state in which camera 24 is attached to a right surface side of a distal end portion of arm 22. FIG. 4D illustrates a state in which camera 24 is attached to a left surface side of a distal end portion of arm 22. As shown in FIGS. 4A to 4D, fifth link 35 has four attachment surfaces (first to fourth attachment surfaces 35a to 35d) in which adjacent surfaces are perpendicular to each other. Camera 24 is attached and fixed to any of the four mounting surfaces of fifth link 35 via bracket 26 or 27. That is, as shown in the FIG. 4A, by attaching bracket 26 to attachment surface 24a of camera 24 and first attachment surface 35a of fifth link 35 using bolts or the like, camera 24 is fixed at a position on the front side of fifth link 35. As shown in the FIG. 4B, bracket 27 is attached to mounting surface 24a of camera 24 and second mounting surface 35b of fifth link 35 by using bolts or the like, and the camera 24 is fixed at a position on the rear surface of fifth link 35. Further, as shown in FIG. 4C, bracket 26 is attached to attachment surface 24a of camera 24 and third attachment surface 35c of fifth link 35 by using bolts or the like, and camera 24 is fixed at a position on the right side of fifth link 35. Also, as shown in FIG. 4D, bracket 26 is attached to attachment surface 24a of camera 24 and fourth attachment surface 35d of fifth link 35 by using bolts or the like, and camera 24 is fixed at a position on the left side of fifth link 35. Bracket 27 used when camera 24 is fixed at the position on the rear surface side of fifth link 35 is formed in a shape different from bracket 26 used when camera 24 and arm 22 are fixed at other positions so as not to interfere with each other.

As described above, robot 20 according to the present embodiment is configured so that the position of camera 24 attached to the distal end portion (fifth link 35) of arm 22 can be selected from four positions (front side, rear side, right side, and left side). Therefore, for example, as shown in FIG. 1, when two robots 20 that cooperate with each other to perform work are arranged side by side in the left and right direction, camera 24 is attached to the right side of arm 22 (fifth link 35) of the robot 20 that is arranged on the right side. Also, with robot 20 arranged on the left side, camera 24 is attached to the left side of arm 22 (fifth link 35). This prevents camera 24 attached to arm 22 of one robot 20 from interfering with arm 22 of the other robot 20.

As shown in FIG. 3, control device 70 is configured as a microprocessor centered on CPU 71, and includes ROM 72, HDD 73, RAM 74, an input-output interface (not shown), and the like in addition to CPU 71. HDD 73 memorizes an operation program of robots 20, an image processing program for processing an image captured by camera 24, and the like. An image signal from camera 24, a detection signal from encoders 61 to 65, an input signal from input device 75, and the like are input to control device 70. Input device 75 is, for example, an input device such as a keyboard, a mouse, or the like, through which an operator performs an input operation. Control device 70 outputs a control signal to conveyance device 12, a drive signal to camera 24, a drive signal to motors 51 to 55, an output signal to output device 76, and the like. Output device 76 is a display device for displaying various information, such as a liquid crystal display, for example.

ROM 72 memorizes camera-related information relating to camera 24. The camera-related information includes information such as the resolution of camera 24 and offset information. FIG. 5 illustrates offset information of camera 24. The offset information is information including offset amounts in the respective directions of the X-axis direction, the Y-axis direction, and the Z-axis direction from the origin (the distal end of sixth link 36) in the orthogonal coordinate system of arm 22 to the imaging center of camera 24. This information is memorized in advance on ROM 72 in association with the attachment positions CP (front side, rear side, right side, and left side) of camera 24.

Control device 70 performs drive control of motors 51 to 55 of robot 20 to move the work tool attached to the distal end link (sixth link 36) of arm 22 toward the workpiece, and perform a specified operation on the workpiece using the work tool. Specifically, control device 70 acquires the target position (X, Y, Z) and the target attitude (RB, RC) of the work tool for performing the work on the workpiece. Subsequently, control device 70 converts the acquired target position (X, Y, Z) and target attitude (RB, RC) into a target position (target angle) of each joint of arm 22 using well-known DH parameters or the like. Then, control device 70 performs drive control of the corresponding motors 51 to 55 so that the position (angle) of each joint coincides with the coordinate-transformed target position (target angle), and performs drive control of the work tool such that the work is performed on the workpiece.

Figure 6:
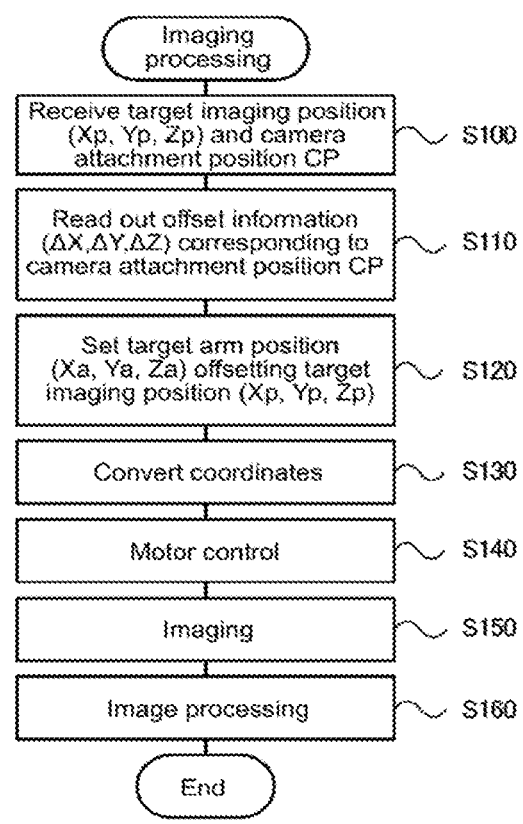
FIG. 6 is a flowchart showing an example of imaging processing.

FIG. 6 is a flowchart showing an example of imaging processing performed by CPU 71 of control device 70. The imaging processing is processing for capturing an image of a workpiece to be worked by camera 24 and recognizing the position and orientation of the workpiece before the specified work is performed.

When the imaging processing is performed, CPU 71 of control device 70 first receives the target imaging position (Xp, Yp, Zp) and camera attachment position CP (S100). Here, the target imaging position (Xp, Yp, Zp) is determined above the conveyance position of the workpiece by conveyance device 12. The positioning of arm 22 with respect to the target imaging position (Xp, Yp, Zp) can be performed, for example, by a teaching operation in which an operator moves arm 22 of robot 20 by a manual operation while continuously recording the movement in a recording device, then reproducing the recorded operation. The camera attachment position CP is selected by the operator using input device 75 in accordance with the position at which camera 24 is actually mounted, that is, the front side, the rear side, the right side, or the left side of fifth link 35.

Subsequently, CPU 71 reads out the offset information ($\Delta X$, $\Delta Y$, $\Delta Z$) corresponding to the inputted camera attachment position CP from the ROM 72 (S110). Further, CPU 71 sets the target imaging position (Xp, Yp, Zp) offset by $\Delta X$, $\Delta Y$, $\Delta Z$ in the X, Y and Z directions based on the offset information ($\Delta X$, $\Delta Y$, $\Delta Z$) to the target arm position (Xa, Ya, Za) (S120). Then, CPU 71 converts the target arm position (Xa, Ya, Za) into the target position (target angles) of each motor 51 to 55 using well-known DH parameters or the like (S130), and performs drive control of the corresponding motors 51 to 55 based on each of the converted target positions (S140). In this manner, CPU 71 sets the target arm position (Xa, Ya, Za) obtained by offsetting the target imaging position (Xp, Yp, Zp) in the offset direction corresponding to the camera attachment position CP by the offset amount, and moves arm 22 to the target arm position (Xa, Ya, Za). As a result, regardless of the attachment position CP of camera 24, the imaging center of camera 24 can be moved to the imaging position (above the conveying position of the workpiece).

Then, CPU 71 captures an image of the workpiece by driving camera 24 (S150), recognizes the position and orientation of the workpiece by processing the captured image of the workpiece (S160), then ends the imaging processing.

Correspondences between main constituent elements of the embodiments and main constituent elements of the disclosure will be clarified here. That is, camera 24 corresponds to a camera, ROM 72 corresponds to a memory device, and control device 70 (CPU 71) for performing the imaging processing of FIG. 6 corresponds to a control device. Further, brackets 26 and 27 correspond to brackets, and first to fourth attachment surfaces 35a to 35d of fifth link 35 of arm 22 correspond to attachment sections.

In robot system 10 described above, the position of camera 24 attached to arm 22 can be changed to multiple positions (the front side, the rear side, the right side, and the left side of fifth link 35). Robot system 10 also memorizes offset information (offset direction and offset amount) between arm 22 and camera 24 for each of the multiple positions. Further, robot system 10 moves the arm to a position offset by the offset information corresponding to the selected attachment position CP of camera 24. As a result, even when attachment position CP of camera 24 is changed, robot system 10 can perform imaging by moving the position of camera 24 to an appropriate position when imaging without requiring troublesome teaching.

In the present embodiment, arm 22 (fifth link 35) has four attachment positions (first to fourth mounting surfaces 35a to 35d) at which camera 24 can be mounted. However, the number of attachment positions of camera 24 may be any number as long as it is two or more. In this case, controller 70 may memorize offset information (offset direction and offset amount) corresponding to the number of attachment positions of camera 24.

In the present embodiment, robot 20 includes vertical articulated arm 22 having five axes. However, the articulated arm is not limited to five axes, and may have, for example, 6 axes or more.

Meanwhile, it goes without saying that the disclosure is not limited to the above-mentioned embodiment and various embodiments may be applied within the technical scope of the disclosure.

INDUSTRIAL APPLICABILITY

The present disclosure can be applied to a robot manufacturing industry and the like.

REFERENCE SIGNS LIST

10: robot system;
11: work table;
12: conveyance device;
20: robot;
22: arm;
24: camera;
24a: attachment surface;
26, 27: bracket;
31: first link;
32: second link;
33: third link;
34: fourth link;
35: fifth link;
35: fifth link;
35b: second attachment surface;
35c: third attachment surface;
35d: fourth attachment surface;
36: sixth link;
41: first joint;
42: second joint;
43: third joint;
44: fourth joint;
45: fifth joint;
51 to 55: motor;
61 to 65: encoder;
70: control device;
71: CPU;
72: ROM;
73: HDD;
74: RAM;
75: input device;
76: output device

The invention claimed is:

1. A robot system comprising:
a multi-joint robot including an arm;
a camera attached to the arm, a position of the camera being attached to the arm at one of multiple predetermined attachment positions of the arm;
a memory device configured to memorize in advance offset information between the arm and the camera for each of the multiple predetermined attachment positions; and
a control device configured to control the multi-joint robot such that, when a target object is imaged by the camera, the control device is configured to
receive a target imaging position and a camera attachment position,
read out the offset information corresponding to the camera attachment position from the memory device,
set a target arm position based on the read-out offset information and the target imaging position, and
move the arm to the target arm position such that the target object is imaged by the camera.

2. The robot system of claim 1, wherein
the offset information includes a distance and a direction of the camera relative to a reference point of the multi-joint robot.

3. The robot system according to claim 1, wherein
the multi-joint robot has multiple attachment sections, the camera is attached to one of the multiple attachment sections via bracket, and each of the multiple attachment sections is configured to fix the bracket in a different direction.

4. The robot system according to claim 3, wherein
the multiple attachment sections are provided on a distal end portion of the arm.

* * * * *